United States Patent
Ikäheimo

(10) Patent No.: US 8,032,168 B2
(45) Date of Patent: Oct. 4, 2011

(54) METHOD, APPARATUS AND COMPUTER PROGRAM PRODUCT FOR MONITORING DATA TRANSMISSION CONNECTIONS

(75) Inventor: Jorma Ikäheimo, Oulu (FI)

(73) Assignee: Nethawk Oyj, Oulu (FI)

( * ) Notice: Subject to any disclaimer, the term of this patent is extended or adjusted under 35 U.S.C. 154(b) by 1075 days.

(21) Appl. No.: 11/629,408

(22) PCT Filed: Jun. 17, 2005

(86) PCT No.: PCT/FI2005/050217
§ 371 (c)(1), (2), (4) Date: Dec. 13, 2006

(87) PCT Pub. No.: WO2005/125246
PCT Pub. Date: Dec. 29, 2005

(65) Prior Publication Data
US 2007/0207770 A1    Sep. 6, 2007

(30) Foreign Application Priority Data
Jun. 18, 2004    (FI) .................................. 20045230

(51) Int. Cl.
*H04B 7/00*    (2006.01)
*H04W 4/00*    (2009.01)

(52) U.S. Cl. ..................... 455/515; 455/434; 455/435.1; 370/328; 370/338

(58) Field of Classification Search .................. 455/436, 455/432.1, 434, 435.1, 515; 370/331, 328, 370/338
See application file for complete search history.

(56) References Cited

U.S. PATENT DOCUMENTS

| | | | |
|---|---|---|---|
| 5,692,035 A * | 11/1997 | O'Mahony et al. | 379/93.01 |
| 5,884,175 A | 3/1999 | Schiefer et al. | |
| 6,356,552 B1 * | 3/2002 | Foglar | 370/395.1 |
| 6,456,845 B1 | 9/2002 | Drum et al. | |
| 6,633,555 B1 | 10/2003 | Lu et al. | |
| 6,725,032 B1 * | 4/2004 | Sheridan et al. | 455/419 |
| 6,765,916 B1 * | 7/2004 | Duvvuru et al. | 370/395.5 |
| 7,216,174 B2 * | 5/2007 | Andrus et al. | 709/227 |
| 7,392,301 B1 * | 6/2008 | Perry et al. | 709/221 |

(Continued)

FOREIGN PATENT DOCUMENTS
EP    280462 A1 *    8/1988

(Continued)

OTHER PUBLICATIONS
Official Action issued by the Finnish Patent Office on Nov. 19, 2004 in Finnish priority application No. FI 20045230.

(Continued)

*Primary Examiner* — Christopher M Brandt
(74) *Attorney, Agent, or Firm* — Buchanan Ingersoll & Rooney PC

(57) ABSTRACT

A method, device and computer program product for monitoring data transmission connections. The method comprises monitoring data transmission connections between a cellular radio network and a subscriber terminal with two analyzers. With the first analyzer, first connection information is collected on a first data transmission connection of the subscriber terminal to a first cell. With the second analyzer, second connection information is collected on a second data transmission connection of the subscriber terminal to a second cell. The first connection information is transferred from the first analyzer to the second analyzer. In the second analyzer, the first connection information is used combined with the second connection information for analyzing the second data transmission connection.

26 Claims, 10 Drawing Sheets

U.S. PATENT DOCUMENTS

| | | | |
|---|---|---|---|
| 7,519,718 B2 * | 4/2009 | Burckart et al. | 709/230 |
| 2002/0114306 A1 * | 8/2002 | Kuusinen et al. | 370/342 |
| 2003/0133494 A1 * | 7/2003 | Bender et al. | 375/130 |
| 2003/0171129 A1 * | 9/2003 | Sagne | 455/517 |
| 2003/0193913 A1 * | 10/2003 | Murata et al. | 370/332 |
| 2004/0018853 A1 * | 1/2004 | Lewis | 455/552.1 |
| 2004/0077349 A1 * | 4/2004 | Barak et al. | 455/436 |
| 2004/0120265 A1 * | 6/2004 | Numminen et al. | 370/252 |
| 2004/0131079 A1 * | 7/2004 | Hegde et al. | 370/466 |

FOREIGN PATENT DOCUMENTS

| | | |
|---|---|---|
| EP | 0 805 608 B1 | 11/1997 |
| EP | 0 848 567 A1 | 6/1998 |
| EP | 1 018 847 A1 | 7/2000 |
| FI | 20031803 | 6/2005 |
| FI | 116763 B | 2/2006 |
| FI | 117228 B | 7/2006 |
| WO | 02/49375 A2 | 6/2002 |
| WO | 2005/034551 A1 | 4/2005 |
| WO | 2005/088906 A1 | 9/2005 |
| WO | 2005/101795 A1 | 10/2005 |

OTHER PUBLICATIONS

International Search Report dated Sep. 14, 2005.
Written Opinion of the International Searching Authority dated Aug. 31, 2005.
Supplementary European Search Report corresponding to EP 05 75 4211 issued on Feb. 24, 2011.

* cited by examiner

METHOD, APPARATUS AND COMPUTER PROGRAM PRODUCT FOR MONITORING DATA TRANSMISSION CONNECTIONS

FIELD

The invention relates to a method for monitoring data transmission connections between a cellular radio network and a subscriber terminal with two analyzers; an analyzer for monitoring data transmission connections between a cellular radio network and a subscriber terminal; and a computer program product encoding a computer process for monitoring data transmission connections between a cellular radio network and a subscriber terminal.

BACKGROUND

In digital data transmission networks, such as in cellular radio networks, different analyzers and simulators for measuring the operation of the network are used. Analyzers can be used for monitoring data transmission connections between a cellular radio network and a subscriber terminal, for example.

Publication U.S. Pat. No. 5,884,175 discloses a method and an apparatus for monitoring data transmission transactions in a mobile network. The method of the publication comprises monitoring a first signaling channel, and detecting a first signaling transaction, which is transferred out of the monitored cell with handover, and at least one predetermined message parameter is captured from the transaction. In addition, the method comprises monitoring a second signaling channel and detecting a signaling transaction (handover) with which the transfer to the cell takes place, and capturing said at least one predetermined message parameter from the transaction. Further, the method comprises comparing values of parameters captured in the preceding phases, and if the values are the same, it is concluded that the first and the second transaction belong together.

The described method does not function in all mobile networks, because there are not always common parameter values, in which case monitoring handovers with the method fails, and thus monitoring calls by using the method fails too.

It is difficult to monitor the Iub interface of a 3G cellular radio network because monitoring protocols used on AAL2 (ATM Adaptation Layer Type 2) connections requires capturing the configuration information of the protocols from the configuration messages transmitted to a mobile phone and from the configuration messages transmitted to a base transceiver station. In a case of handover, the subscriber terminal moves from one base transceiver station to another, whereby configuration messages of a radio link are transmitted to the new base transceiver station, but no configuration messages of the connection are transmitted to the subscriber terminal via the new base transceiver station any more. If the interface monitoring is distributed between two devices and the handover takes place between the devices, the receiving apparatus has no information on configuration messages of the subscriber terminal, so that decoding of protocols cannot be performed.

The problem can be solved in such a way that the device monitoring the new channel attempts to identify the correct configuration of the protocols. However, this takes processor time and can lead to incorrect decoding results. In addition, it is not necessarily possible to specify the signaling of which subscriber terminal is monitored, and so the call tracing fails. Automatic identification of protocols may also be needed because it is not always possible to monitor the signaling transaction from the beginning. Thus, the connections that are not monitored from the beginning cannot be configured with configuration based merely on monitoring messages.

Another possibility is that the monitoring is performed with one device. This is problematic, however, because different interfaces can be positioned far away from each other (e.g. in a case of Abis/Iub interfaces), whereby the problem is the transfer of messages from the interfaces to the device to be monitored; the problem is also that the performance of one device is not necessarily sufficient for monitoring all cells.

When tracing calls, it is necessary to be able to monitor the call when handover is taking place. The user identifier is usually visible in the network to be monitored only at the beginning of the call. So in a case where the start of a call is monitored with a first analyzer and where the call is transferred with handover to an interface monitored by a second analyzer, the call cannot be identified on the second interface, and thus call tracing cannot be performed. In call tracing, the problem is both the configuration of the connections to be monitored and the monitoring of handovers.

BRIEF DESCRIPTION

An object of the invention is to provide an improved method for monitoring data transmission connections between a cellular radio network and a subscriber terminal with two analyzers; an improved analyzer for monitoring data transmission connections between a cellular radio network and a subscriber terminal; and an improved computer program product encoding a computer process for monitoring data transmission connections between a cellular radio network and a subscriber terminal with two analyzers.

As an aspect of the invention, there is provided a method for monitoring data transmission connections between a cellular radio network and a subscriber terminal with two analyzers, the method comprising: collecting, by means of a first analyzer, first connection information on a first data transmission connection of the subscriber terminal to a first cell; and collecting, by means of a second analyzer, second connection information on a second data transmission connection of the subscriber terminal to a second cell. The method further comprises: transferring the first connection information from the first analyzer to the second analyzer; and using in the second analyzer the first connection information combined with the second connection information for analyzing the second data transmission connection.

As an aspect of the invention, there is provided an analyzer for monitoring data transmission connections between a cellular radio network and a subscriber terminal, the analyzer comprising: a monitoring unit via which the analyzer is connectable to monitor a second data transmission connection of the subscriber terminal to a second cell; and a processing unit coupled to the monitoring unit, configured to collect second connection information on the second data transmission connection of the subscriber terminal to the second cell. The analyzer further comprises a data transmission unit coupled to the processing unit, configured to receive from a first analyzer first connection information on a first data transmission connection of the subscriber terminal to a first cell; the processing unit being further configured to use the first connection information combined with the second connection information for analyzing the second data transmission connection.

As an aspect of the invention, there is provided an analyzer for monitoring data transmission connections between a cellular radio network and a subscriber terminal, the device comprising: monitoring means for monitoring a second data transmission connection of the subscriber terminal to a second cell; and first processing means for collecting second connection information on the second data transmission connection of the subscriber terminal to the second cell. The analyzer further comprises data transmission means for receiving from a first analyzer first connection information on a first data transmission connection of the subscriber terminal to a first cell; and second processing means for using the first connection information combined with the second connection information for analyzing the second data transmission connection.

As an aspect of the invention, there is provided a computer program product encoding a computer process for monitoring data transmission connections between a cellular radio network and a subscriber terminal with two analyzers, the computer process comprising: collecting, by means of a first analyzer, first connection Information on a first data transmission connection of the subscriber terminal to a first cell; and collecting, by means of a second analyzer, second connection information on a second data transmission connection of the subscriber terminal to a second cell. The computer process further comprises: transferring the first connection information from the first analyzer to the second analyzer; and using in the second analyzer the first connection information combined with the second information for analyzing the second data transmission connection.

Several advantages are achieved with the invention. The invention can be used for monitoring 2G, 2.5G as well 3G cellular radio networks. Thus, it is also easy to implement the invention. The solution according to the invention provides a plurality of advantages: protocols can be decoded in all situations; it is also known the whole time which subscriber terminal uses which connection to be monitored, so it is easy to do call tracing. The invention can be used to monitor soft handover in UMTS, to monitor hard handover between GSM and UMTS, to monitor hard handover between cells in UMTS, and in many other corresponding cases.

LIST OF FIGURES

The invention will be now described in more detail in connection with preferred embodiments, referring to the attached drawings, of which FIG. 1 illustrates monitoring a cellular radio network with two analyzers;

FIGS. 8, 9 and 10 are signaling sequence charts, of which FIG. 8 shows a signaling sequence for establishing an RRC connection for a subscriber terminal, FIG. 9 shows a signaling sequence for establishing a "User plane" connection for a subscriber terminal, and FIG. 10 shows a signaling sequence for performing soft handover;

DESCRIPTION OF EMBODIMENTS

Figure 1:
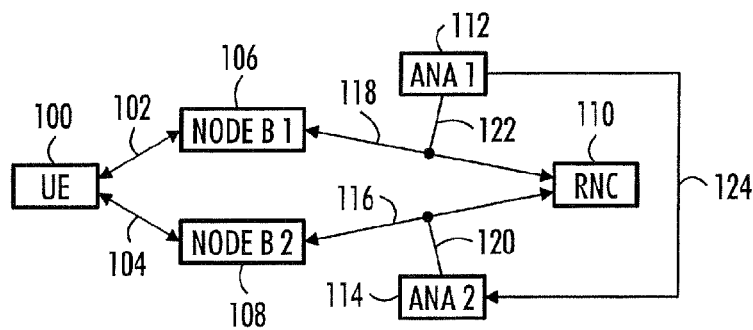

FIG. 1 shows an example of a cellular radio network to which monitoring can be applied. The cellular radio network may be based on, for example, GSM (Global System for Mobile Communications), WCDMA (Wideband Code Division Multiple Access) or CDMA (Code Division Multiple Access) technology. Here, only a radio network controller 110 and two base transceiver stations 106, 108 under its control are described. A subscriber terminal 100 has a radio connection 102 to the first base transceiver station 106, and a radio connection 104 to the second base transceiver station 108.

It is obvious that the cellular radio network also comprises other devices, but it is not relevant to describe them here. Depending on the system, the names of the devices may vary; therefore, the radio network controller 110 can also be called a base station controller, the base transceiver station 106, 108 can be called node B, and the subscriber terminal 100 can be called user equipment.

There is a first data transmission connection 118 between the radio network controller 110 and the first base transceiver station 106, and a second data transmission connection 116 between the radio network controller 110 and the second base transceiver station 108. A first analyzer 112 may be coupled 122 to monitor the first data transmission connection 118, and a second analyzer 114 may be coupled 120 to monitor the second data transmission connection 116. A data transmission connection 124 can be established between the first analyzer 112 and the second analyzer 114.

To implement the couplings 120, 122 and the data transmission connection 124, known wired or wireless communication technologies suitable for the purpose may be used, including fixed cable connections (e.g. local area network, LAN), GSM/GPRS/EDGE connections or, for instance, short-range wireless connections, such as Bluetooth®, infrared or WLAN (Wireless Local Area Network) connections.

Although the connections 120, 122 in FIG. 1 are set up on the interface between the base transceiver station 106, 108 and the radio network controller 110, known system-specifically for example as the Iub or Abis interface, it is obvious that connections can also be set up on other interfaces not described here, depending on the system and the monitoring requirements.

Figure 2:
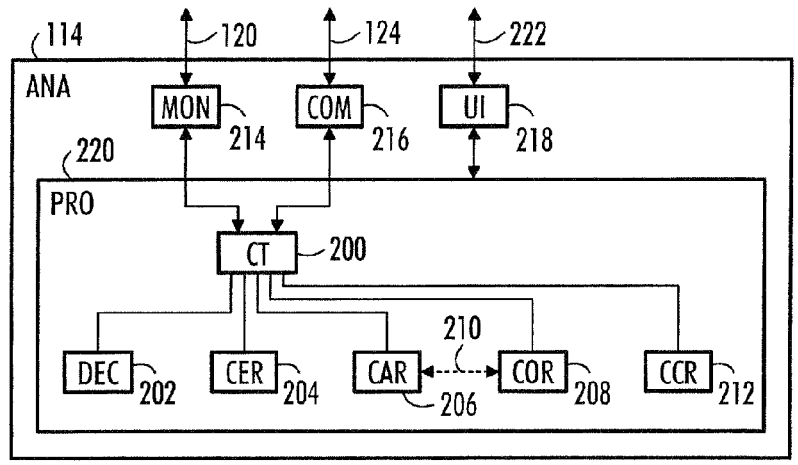
FIG. 2 is a simplified block diagram of the structure of an analyzer.

FIG. 2 illustrates the structure of the analyzer 112, 114 in greater detail. This is, as mentioned, the analyzer 112, 114 for monitoring data transmission connections between a cellular radio network and the subscriber terminal 100. The structures of the first analyzer 112 and the second analyzer 114 may be similar, in other words the analyzer can operate normally in any of the two roles. Next, it is mainly the structure of the analyzer functioning in the role of the second analyzer 114 that is described. The analyzer 114 comprises a monitoring unit 214, via which the analyzer 114 is connectable to monitor the second data transmission connection of the subscriber terminal 100 to the second cell, i.e. in our example the data transmission connection 116 between the second base transceiver station 108 and the radio network controller 110.

Further, the analyzer 114 comprises a processing unit 220 coupled to a monitoring unit 214, configured to collect second connection information on the second data transmission connection 116 of the subscriber terminal 100 to the second cell.

The analyzer 114 also comprises a data transmission unit 216 coupled to the processing unit 220, configured to receive from the first analyzer 112 first connection information on the first data transmission connection of the subscriber terminal 100 to the first cell, i.e. in our example information collected on the data transmission connection 118 between the base transceiver station 106 and the radio network controller 110, along the data transmission connection 124 between the analyzers 112, 114.

The processing unit 220 is further configured to use the first connection information combined with the second connection information for analyzing the data transmission connection 116.

Although the embodiments describe the use of two analyzers 112, 114, it is obvious that more analyzers may also be used. The analyzers 112, 114 may be equal, independent devices communicating with each other, or they may form different structures according to master/slave architecture, for instance with one of the analyzers collecting and presenting in a centralized manner information collected by other analyzers. In one embodiment, the processing unit 220 is configured to attach the identifier of the user of the subscriber terminal 100 to the connection information, and to use the user identifier for presenting, combined, the monitoring of the connections of the subscriber terminal 100, performed with different analyzers. The processing unit 220 can be configured to perform call tracing by using the first connection information and the second connection information on the basis of the subscriber identifier.

The analyzer 112, 114 may be a protocol analyzer used in measuring the operation of data communication systems, a simulator or an interface board. The analyzer 112, 114 may be a personal computer provided with, for example, Windows® or another operating system, connected to the interfaces to be measured via network interface cards and measuring sensors. The analyzers 112, 114 may be, for example, of the analyzer type manufactured by Nethawk Oyj, such as the ones described in patent applications Fl 20031803, Fl 20040397 and Fl 20045134, incorporated herein by reference.

The analyzer 112, 114 may also comprise a user interface 218, with which the functions of the analyzer 112, 114 can be controlled, for instance according to the user's commands 222, and with which the functions executed by the analyzer 112, 114 can be monitored. The user interface 218 comprises, for example, a display, a keyboard and a pointing device, such as a mouse. The user interface 218 may, depending on the analyzer 112, 114, comprise several and different kinds of user interface parts. The analyzer 112, 114 may also comprise a memory as well as other different elements, depending on the purpose of use.

The processing unit 220 refers to a block controlling the operation of a device, usually implemented as a processor with software these days, but also different hardware implementations are feasible, for instance a circuit constructed of separate logic components or one or more application-specific integrated circuits (ASIC). Also a hybrid of these different implementations is possible.

In one embodiment, the processing unit 220 is configured to configure decoding of the transmission protocol of the second data transmission connection 104, 116 on the basis of an analysis performed for the second data transmission connection. The processing unit 220 may comprise a set of protocol-specific decoding components executing the decoding of the protocols.

In one embodiment, the processing unit 220 is further configured to collect the channel parameters of the second cell from the second interface with the monitoring unit 214, and to transfer the channel parameters of the second cell to the first analyzer 112, so that it becomes possible to compare in the first analyzer 112 whether the first connection information contains matter relating to the channel parameters of the second cell, and if this condition is met, to perform transfer of the first connection information from the first analyzer 112 to the second analyzer 114. Alternatively, the data transmission unit 216 of the second analyzer 114 can be configured to receive broadcast transfer of the first connection information from the first analyzer 112, in which case channel parameter transfer is not necessarily needed.

The processing unit 220 can be configured to process channel parameters as cell records and to attach to the cell records the identifier of the monitoring analyzer, for instance its IP (Internet Protocol) address.

The processing unit 220 can be configured to process the scrambling code, identifier and/or radio channel information of the cell as channel parameters in the cell records. In a 3G cellular radio network, the channel parameters may include the primary scrambling code and the cell identifier. Also the radio frequency of the uplink and downlink may be taken into consideration if the object of the monitoring is a system operating at several frequencies. In a 2G cellular radio network, the channel parameters of the cell may include the number of the radio channel and the cell identifier.

In one embodiment, the processing unit 220 is configured to generate call records containing information required for monitoring a given data transmission connection and decoding messages; to generate, on the basis of the connection information, connection records containing information required for monitoring a given type of transmission connection and decoding messages; and to link call records and connection records with each other.

The processing unit 220 can be configured to process at least one of the following as connection information in a call record: C-RNTI (Cell Radio Network Temporary Identifier), U-RNTI (UTRAN Radio Network Temporary Identifier), RRC (Radio Resource Control) connection state, subscriber terminal identifier, subscriber identifier, uplink scrambling code, active set, RAB (Radio Access Bearer) and ciphering key. Relating to RAB, the processing unit 220 can be configured to process in a call record at least one of the following: layer type, logical channel identifiers, mapped radio bearers, RLC (Radio Link Control) modes and hyperframe numbers. The processing unit 220 can be configured to process at least one of the following as connection information in a connection record: CRNC (Controlling Radio Network Controller) communication context identifier, base station communication context identifier, transaction identifier, DCH channels and radio links. Relating to a DCH channel, the processing unit 220 can be configured to process at least one of the following in a connection record: DCH identifier, uplink scrambling code, transport formats (Transport Format Set, TFS), mapped radio bearers, logical channel identifiers, RLC modes, binding identifier, transport layer address, path identifier, channel identifier, virtual path identifier, channel identifier and line identifier.

In one embodiment, the processing unit 220 is configured to generate, on the basis of the connection information, connection configuration records containing information on detected and predetermined data transmission configurations; and to identify the protocol configuration automatically by comparing the connection record with the connection configuration records on the basis of a predetermined logic. The connection configuration records may include at least one of the following: transport formats, logical channel identifiers, mapped radio bearers and RLC modes.

In addition, the processing unit 220 may comprise a connection-monitoring component 200, which monitors the call connections and maintains call records 206 and cell channel parameters in the cell records 204 on the basis of the decoded messages received from the decoding components 202. The connection-monitoring component 200 may configure the decoding components 202 to perform decoding according to the connection record 208. The connection-monitoring component 200 may, in addition, maintain connection records 208 and connection configuration records 212 on detected and predetermined data transmission configurations. Between the call record 206 and the connection record 208, there is a relation 210 described later on.

Next, soft handover is described with reference to FIG. 1. At the beginning, the analyzers 112 and 114 collect channel parameters of cells to cell records 204.

The subscriber terminal 100 establishes a first radio connection 102 to the first base transceiver station 106. The first analyzer 112 monitors the call and collects the necessary information to the connection record 206 and the call record 208.

In soft handover, the radio network controller 110 establishes a new radio link to the second base transceiver station 108. The second analyzer 114 captures the messages and creates a new connection record 206 and call record 208 according to them. The radio network controller 110 performs soft handover by transmitting an "active set update" message via the first base transceiver station 106 to the subscriber terminal 100. The subscriber terminal 100 sets up a second radio connection 104 to the second base transceiver station 108. The first analyzer 112 captures the "active set update" message, detects the addition of the new radio link 104 and transmits the call record 206 associated with the connection to the second analyzer 114 via the data transmission connection 124. The connection-monitoring component 200 of the second analyzer 114 adds information on the received call record to the existing call record 206, updates the connection record 208 on the basis of the call record 206 and configures the decoding components 202 of the protocols in accordance with the connection record 208.

In the monitoring described, the processing unit 220 is thus configured to process the first data transmission connection 102,118 as a data transmission connection of the subscriber terminal 100 to the serving cell, and the second data transmission connection 104, 116 as a data transmission connection of the subscriber terminal 100 to a new cell in connection with handover. The analyzers 112, 114 can also be used for monitoring activities other than handover. In one embodiment, the processing unit 220 can be configured to process the second data transmission connection 104, 116 as the subscriber terminal's 100 data transmission connection implementing radio diversity.

Figure 16:
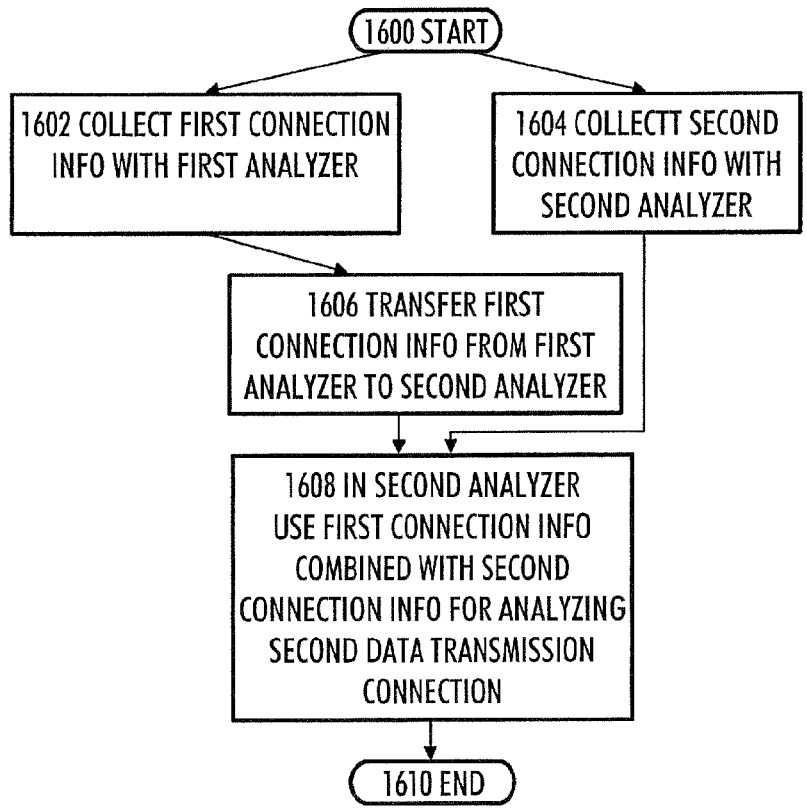
FIG. 16 illustrates one embodiment of the monitoring method.

Next, referring to FIG. 16, a method for monitoring data transmission connections between a cellular radio network and a subscriber terminal with two analyzers is described.

The method starts at 1600. Then, activities 1602 and 1604 are performed; they are not dependent on each other but can be performed for instance in parallel or succeeding each other in time. The activity 1602 comprises collecting with the first analyzer first connection information on a first data transmission connection of the subscriber terminal to a first cell. The activity 1604 comprises collecting with the second analyzer second connection information on a second data transmission connection of the subscriber terminal to a second cell.

Subsequently, at 1606 first communication information is transferred from the first analyzer to the second analyzer. Finally, at 1608 the first connection information is used combined with the second information in the second analyzer for analyzing the second data transmission connection. The method ends at 1610. The method can be performed as long as data transmission connections are to be monitored. In practice, it is possible to monitor with two analyzers the data transmission connections of even more than one subscriber device, naturally depending on processing efficiency, for example. By means of the method, decoding of the transmission protocol of the second data transmission connection can be configured on the basis of the analysis performed for the second data transmission connection.

In one embodiment, the method further comprises: attaching the identifier of the subscriber of the subscriber terminal to the connection information; and using the subscriber identifier for presenting combined monitoring of subscriber terminal connections, performed with different analyzers. The method may also comprise: performing call tracing by using the first connection information and the second connection information on the basis of the subscriber identifier.

In one embodiment, the method further comprises: collecting the channel parameters of the second cell from the second interface with the second analyzer; transferring the channel parameters of the second cell from the second analyzer to the first analyzer; and comparing in the first analyzer whether the first connection information contains matter relating to the channel parameters of the second cell; and if this condition is met, transferring the first connection information from the first analyzer to the second analyzer. If desired, the channel parameters can be processed as cell records, and the identifier of the analyzer monitoring the cell can be attached to the cell records. As explained above, for instance the scrambling code of the cell, the cell identifier and/or the radio channel information of the cell can be processed as channel parameters in cell records.

As an alternative of or a compliment to the transfer of the channel parameters of the cell, the first connection information can be transferred from the first analyzer to the second analyzer by using broadcast.

Figure 4:
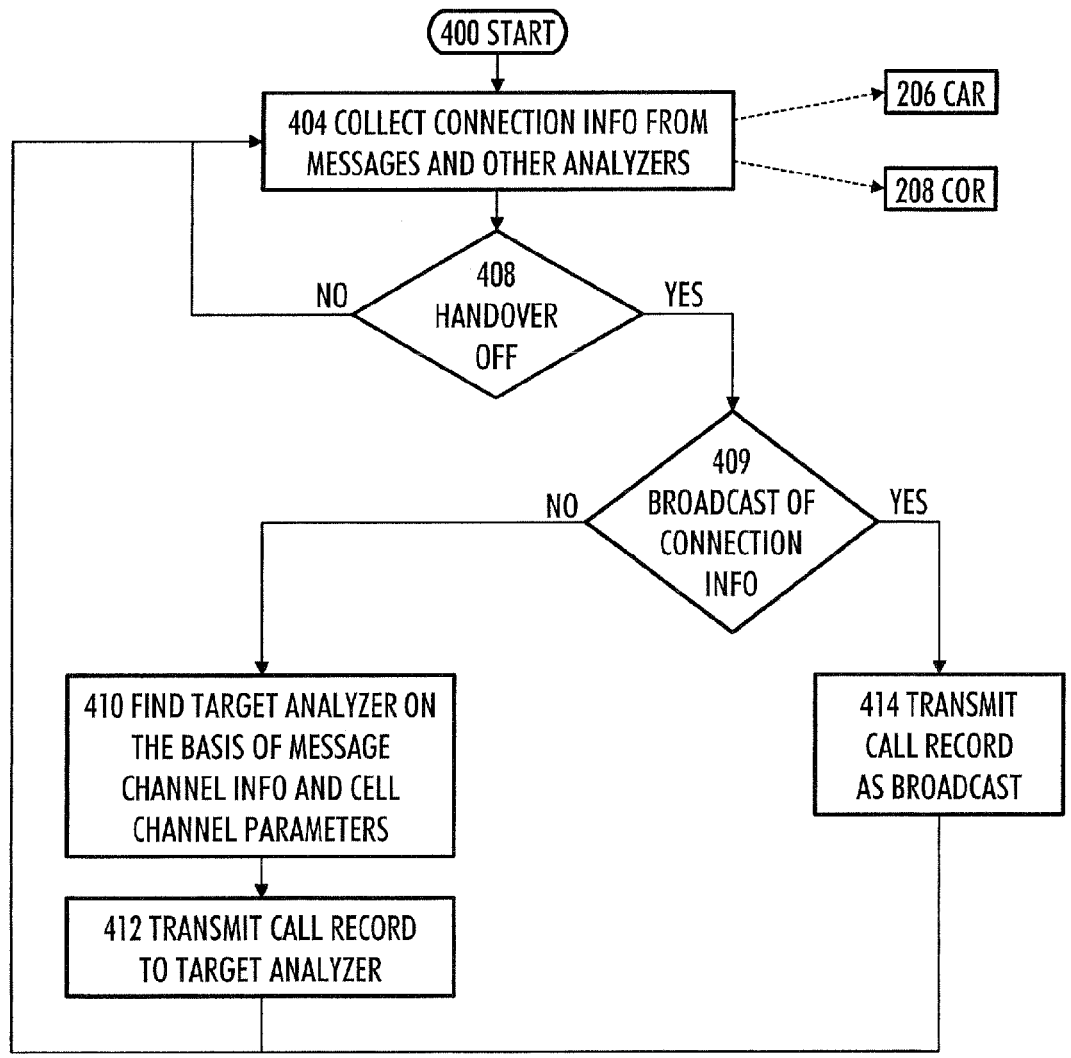
FIGS. 3 and 4 are flow charts illustrating embodiments of the monitoring method.
Figure 3:
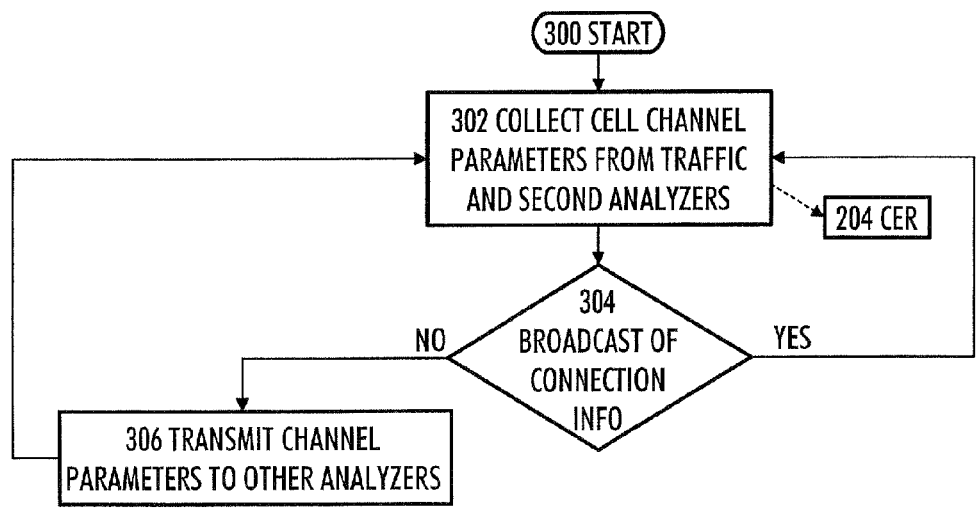

FIGS. 3 and 4 describe the monitoring method with both the transfer of channel parameters and broadcast of connection information. The method consists of two phases that can be performed simultaneously or at different times. The performance of the phases can be stopped when it is no longer desirable to continue the monitoring. The first phase begins at 300. At 302, the channel parameters of the cells are collected from traffic and second analyzers, and stored in cell records 204. At 304, it is found out whether the broadcast of connection information is in use. If it is, one moves on to 302. If it is not, the cell record 204 of the new cell is transmitted to second analyzers at 306, and one moves on to 302.

The second phase begins at 400. At 404, information is collected to the call record 206 and connection record 208 about messages exchanged on the connection and on call records 206 received from second analyzers. At 408, it is found out whether the handover message contains channel identification information of a cell monitored by another analyzer. If it does not, one returns to 404. If it does, it is found out at 409 whether broadcast of call information is in use. If it is not, one moves on to 410, otherwise to 414. At 410, a target analyzer is searched for in the cell records 204 on the basis of the channel information in the handover message. At 412, the call record 206 is transmitted to the target analyzer. From 412, one moves to 404 to continue the information collecting. At 414, the call record 206 is transmitted to other analyzers as broadcast. From 414, one moves to 404 to continue the information collecting. The phase ends for one subscriber terminal, and the connection information is deleted when the connection to the subscriber terminal is released or the handover performed does not leave any channels left to be monitored.

Connection information can be collected simultaneously from all subscriber terminals that have a connection via the interface to be monitored.

The monitoring method can be used for instance for monitoring channel handovers and radio diversity. Thus, the method further comprises: processing in the analyzer the first data transmission connection as a data transmission connection of the subscriber terminal to the serving cell. The method may further comprise: processing in the analyzer the second data transmission connection as a data transmission connection of the subscriber terminal to a new cell in connection with handover, or analyzing in the analyzer the second data transmission connection as the subscriber terminal's data transmission connection implementing radio diversity.

The cell records 204 can be stored for instance on a list from where they can be browsed. The cell record 204 of the Iub interface may contain information indicated in Table 1.

TABLE 1

| Cell record | |
|---|---|
| Information | Meaning |
| Analyzer identifier | Identity of the analyzer analysing the cell, e.g. its IP (Internet Protocol) address |
| Cell identifier | Cell identity, same as in NBAP (Node B Application Part) messages |
| Primary scrambling code | Uplink primary scrambling code |
| Frequency information | Uplink and downlink frequencies used in cell |

In one embodiment, the method further comprises: generating call records containing information needed for monitoring a given data transmission connection and decoding messages; generating, on the basis of the connection information, connection records containing information needed for monitoring a given type of data communication connection and decoding messages; and linking call records and connection records with each other.

The call record 206 contains the information required for call tracing and message decoding. It is preferable to store the call records in hash tables, for example, so that they can be found quickly. The call record 206 of the Iub interface is RRC-dedicated (RRC, Radio Resource Control) and may contain information indicated in Table 2.

TABLE 2

| Call record | |
|---|---|
| Information | Meaning |
| C-RNTI (Cell Radio Network Temporary Identifier) | Temporary identifier allocated for user equipment |
| U-RNTI (UTRAN Radio Network Temporary Identifier) | UTRAN-specific temporary identifier allocated for user equipment. |
| State | State of RRC connection as defined in 3GPP RRC specification |
| Terminal identifier | Contains user equipment and user identifiers detected from traffic, e.g. IMSI (International Mobile Subscriber Identity), IMEI (International Mobile Equipment Identity), TMSI (Temporary Mobile Subscriber Identity) and LAI (Location Area Identification), P-TMSI (Packet Temporary Mobile Subscriber Identity) and RAI (Routing Area Identity) |

TABLE 2-continued

| Call record | |
|---|---|
| Information | Meaning |
| Uplink scrambling code | Uplink scrambling code used by user equipment |
| Active set | Contains information on cells having radio connection to user equipment. Contains, per each connection, link to cell record |
| RAB (Radio Access Bearer) | Contains information on RABs reserved for user equipment. See Table 3. |
| CK (Ciphering Key) | Ciphering key used by user equipment |

RAB of the call record indicated in Table 2 contains information of Table 3 per each RAB.

TABLE 3

| Contents of call record RAB | |
|---|---|
| Information | Meaning |
| Plane type | Channel type: channel of control or user plane |
| Logical channel identifiers | Identifiers of logical MAC (Medium Access Control) channels |
| Mapped radio bearers | Identifiers of radio bearers mapped for logical MAC channels |
| RLC (Radio Link Control) modes | RLC modes of channels mapped for logical MAC channels: transparent, unacknowledged or acknowledged |
| HFNs (Hyper Frame Numbers) | Hyperframe numbers used in radio bearers |

The connection record 208 contains the information on connections opened on the interface to be monitored. It is preferable to store the connection records for instance in hash tables so that they can be found quickly. The connection record of the Iub interface is NBAP-connection-context-specific and may include information designated in Table 4.

TABLE 4

| Connection record | |
|---|---|
| Information | Meaning |
| CRNC (Controlling Radio Network Controller) communication context identifier (CRNC Communication Context ID) | Identifier of connection context of CRNC in NBAP protocol |
| Base station communication context identifier (Node B Communication Context ID) | Identifier of connection context of base station in NBAP protocol |
| Transaction identifier | Identifies message transaction between base station and radio network controller |
| DCH channels | Contains information on occupied DCH channels. See Table 5. |
| Radio links | Contains information on all radio links to which channel is coupled in the form: radio link identifier cell identifier |

The information "DCH channels" in Table 4 contains, per each DCH channel, information indicated in Table 5.

TABLE 5

Contents of DCH channels of connection record

| Information | Meaning |
| --- | --- |
| DCH identifier | Channel identifier |
| Uplink scrambling code | See Table 2. |
| Transport formats | All data transmission formats used in the channel in the form: number of transmission blocks, length of transmission block as bits |
| Mapped radio bearers | See Table 3. |
| Logical channel identifiers | See Table 3. |
| RLC modes | See Table 3. |
| Binding identifier | Identifies user's information flow |
| Transport layer address | Transmission address of traffic channel |
| Path identifier | Identifier of the path of the connection reserved with AAL2 (ATM Adaptation Layer Type 2) signalling protocol to be used by the channel |
| Channel identifier | Identifier of the channel of the connection reserved with AAL2 signalling protocol to be used by the channel |
| Virtual path identifier (VPI), virtual channel identifier (VCI), channel identifier (CID), line identifier | Identifier of mapped AAL2 channel |

In one embodiment the method further comprises: generating, on the basis of the connection information, connection configuration records containing information on detected and predetermined data transmission configurations; and identifying the protocol configuration automatically by comparing the connection record with the connection configuration records on the basis of a predetermined logic. The connection configuration records comprise, in the way indicated by Table 6, at least one of the following: transport formats, logical channel identifiers, mapped radio bearers and RLC modes.

Figure 8:
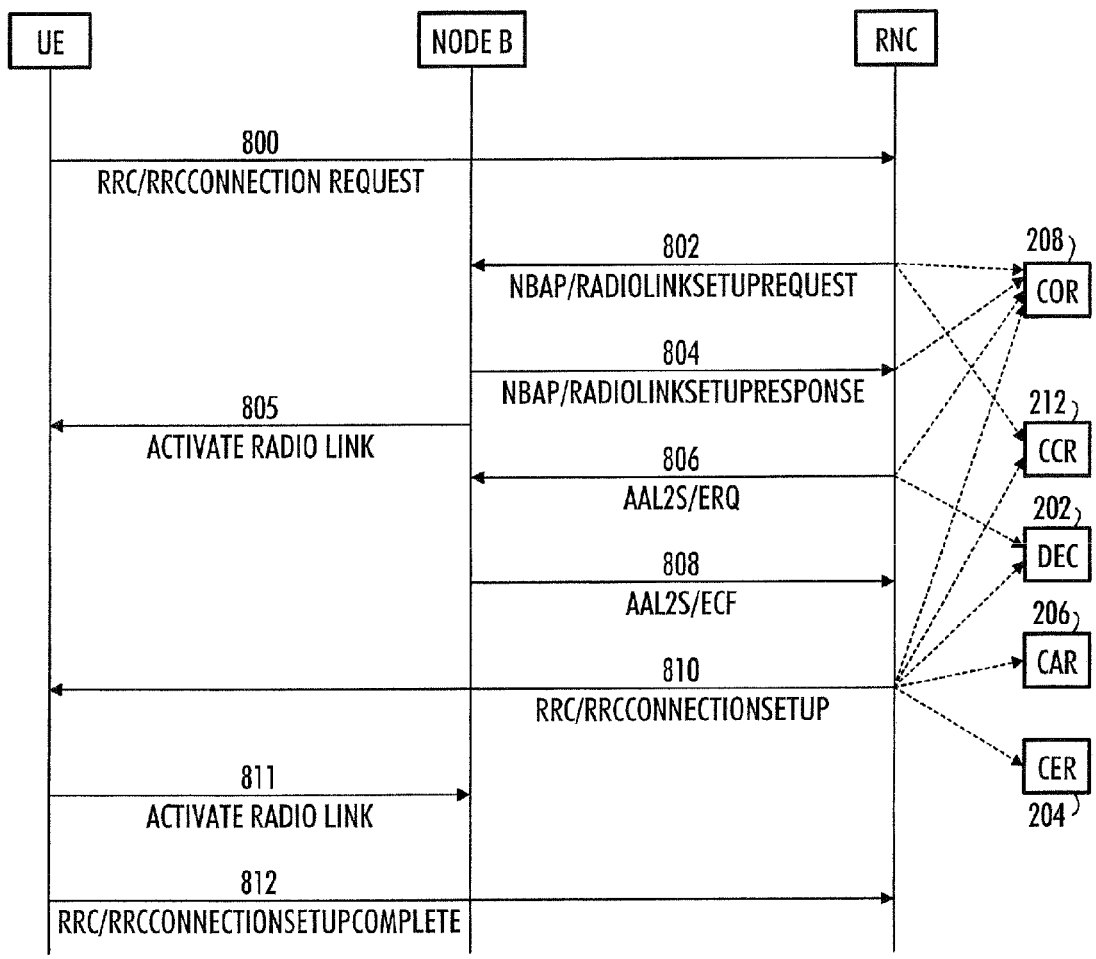
Figure 9:
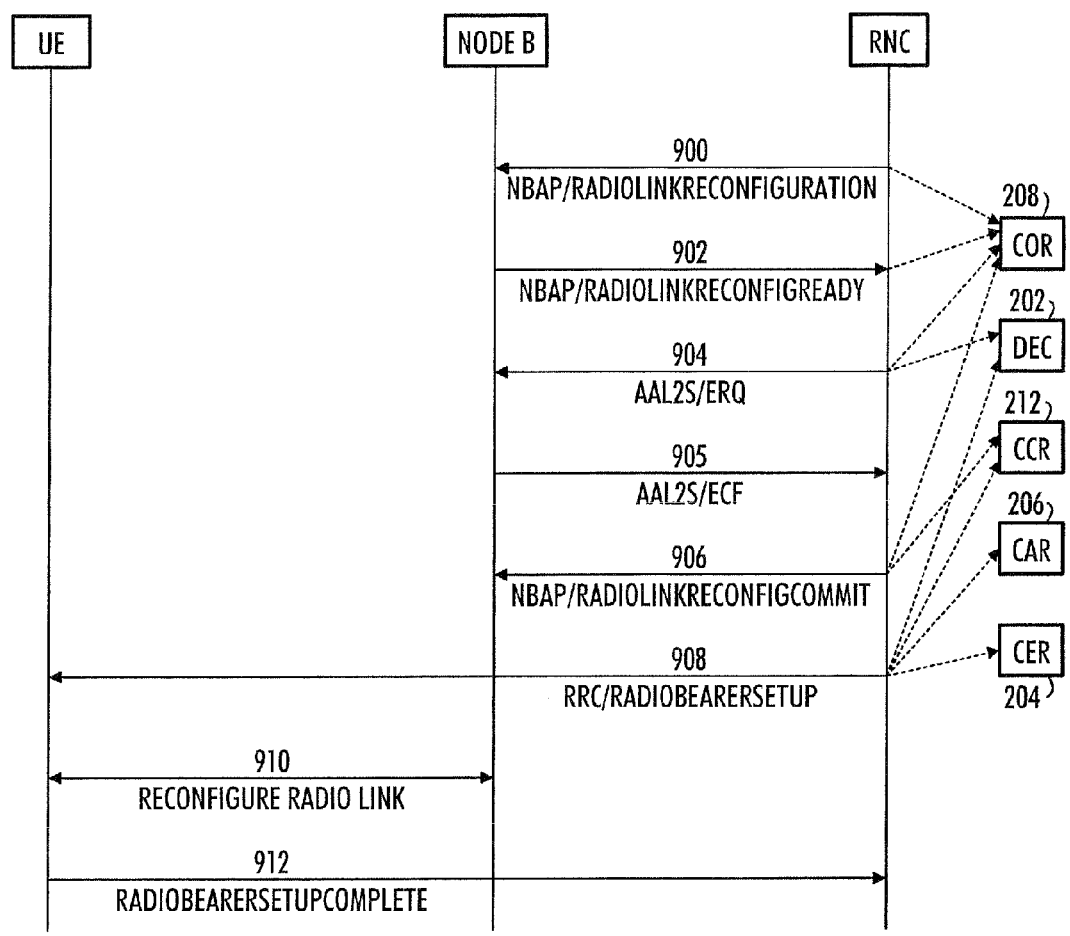
Figure 10:
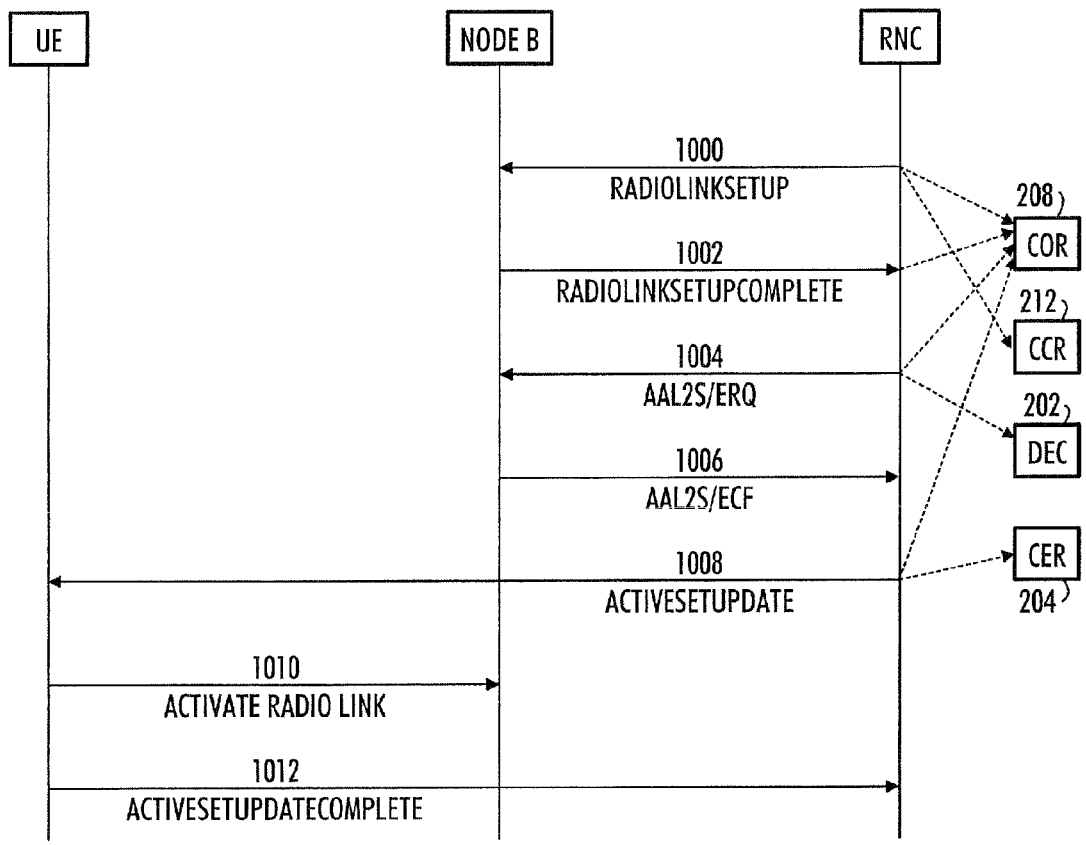

Now, with reference to FIGS. 8, 9 and 10 follows a description of signaling between the user equipment, base transceiver station and the radio network controller, and graphical representation of how signaling information is collected to the decoding components 202, cell records 204, call records 206, connection records 208 and connection configuration records 212.

FIG. 8 describes a signaling sequence of the Iub interface for creating a dedicated RRC connection. First, the user equipment requests connection by transmitting an "RRC/RRCConnectionRequest" message 800. The network processes the message and sets up first a new radio link with an "NBAP/RadioLinkSetup" message 802. When the base transceiver station has set up the radio link, it replies with an "NBAPiRadioLinkSetupResponse" message 804. Subsequently, the base transceiver station activates a downlink radio link 805. The radio link controller opens the AAL2 transmission channel by transmitting an "AAL2S/ERQ" message 806. The base transceiver station replies with an "AAL2S/ECF" message 808. After these phases, the dedicated transmission channel from the radio network controller to the user equipment is ready, and an uplink radio link from the user equipment is opened by transmitting an "RRC/RRCConnectionSetup" message 810 to it. Having received the message, the user equipment activates an uplink radio link 811 and transmits an "RRC/RRCConnectionSetupComplete" message 812 in the opened dedicated transmission channel. After this, the control plane is ready for signaling.

FIG. 9 describes a signaling sequence of the Iub interface for creating a dedicated RAB (radio access bearer). The figure does not show the L3 signaling with which the connection is signalled. The connection set-up is started by transmitting a radio link reconfiguration request with an "NBAP/RadioLinkReconfiguration" message 900. The base transceiver station replies to the readiness for reconfiguring the radio link with an "NBAP/RadioLinkReconfigurationReady" message 902. The radio network controller opens the AAL2 transmission channel by transmitting an "AAL2S/ERQ" message 904. The base transceiver station replies with an "AAL2S/ECF" message 905. After these phases, confirmation on the reconfiguration of the radio link is transmitting to the base transceiver station with an "NBAP/RadioLinkReconfigCommit" message 906, and an uplink-configuring "RRC/RadioBearerSetup" message 908 is transmitted to the user equipment. When the activation time is due, the radio link is reconfigured 910 and the user equipment creates a radio access channel by transmitting an "RRC/RadioBearerSetupComplete" message 912.

FIG. 10 illustrates a signaling sequence of the Iub interface for adding a new radio link by performing soft handover. To start with, a new radio link is set up with an "NBAP/RadioLinkSetup" message 1000. Having set up the radio link, the base transceiver station replies with an "NBAP/RadioLinkSetupResponse" message 1002. The radio network controller opens the AAL2 transmission channel by transmitting an "AAL2S/ERQ" message 1004. The base transceiver station replies with an "AAL2S/ECF" message 1006.

The "AAL2S/ERQ" message 1004 and "AAL2S/ECF" message 1006 are repeated until all required AAL2 connections have been opened. Subsequently, an "RRC/ActiveSetUpdate" message 1008 is transmitted to the user equipment with the old dedicated connection. The user equipment activates a new radio link 1010. When the new connection has been activated, the user equipment confirms the activation by transmitting an "RRC/ActiveSetUpdateComplete" message 1012 by using the new and the old dedicated connection.

Figure 6:
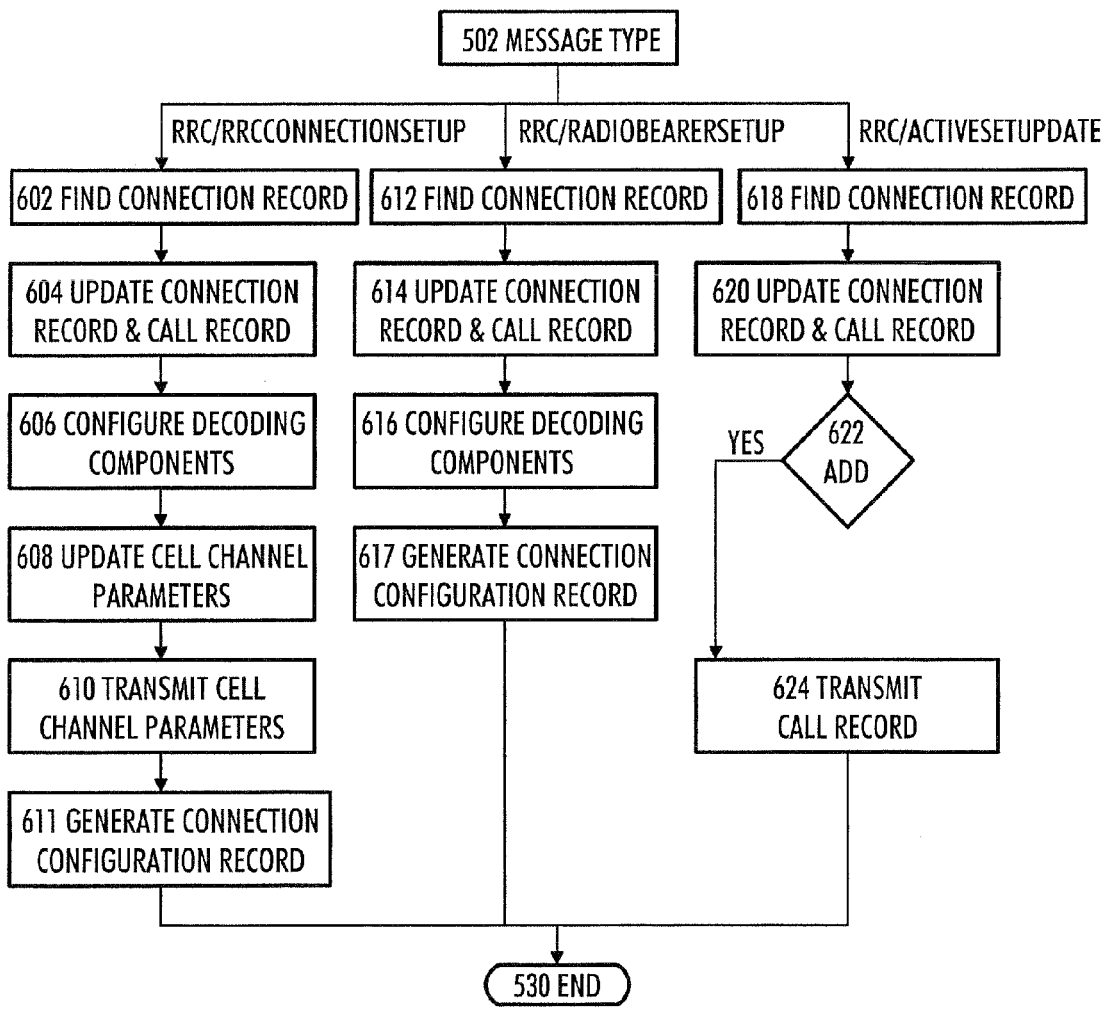
FIGS. 5, 6 and 7 illustrate processing of messages in an analyzer.
Figure 5:
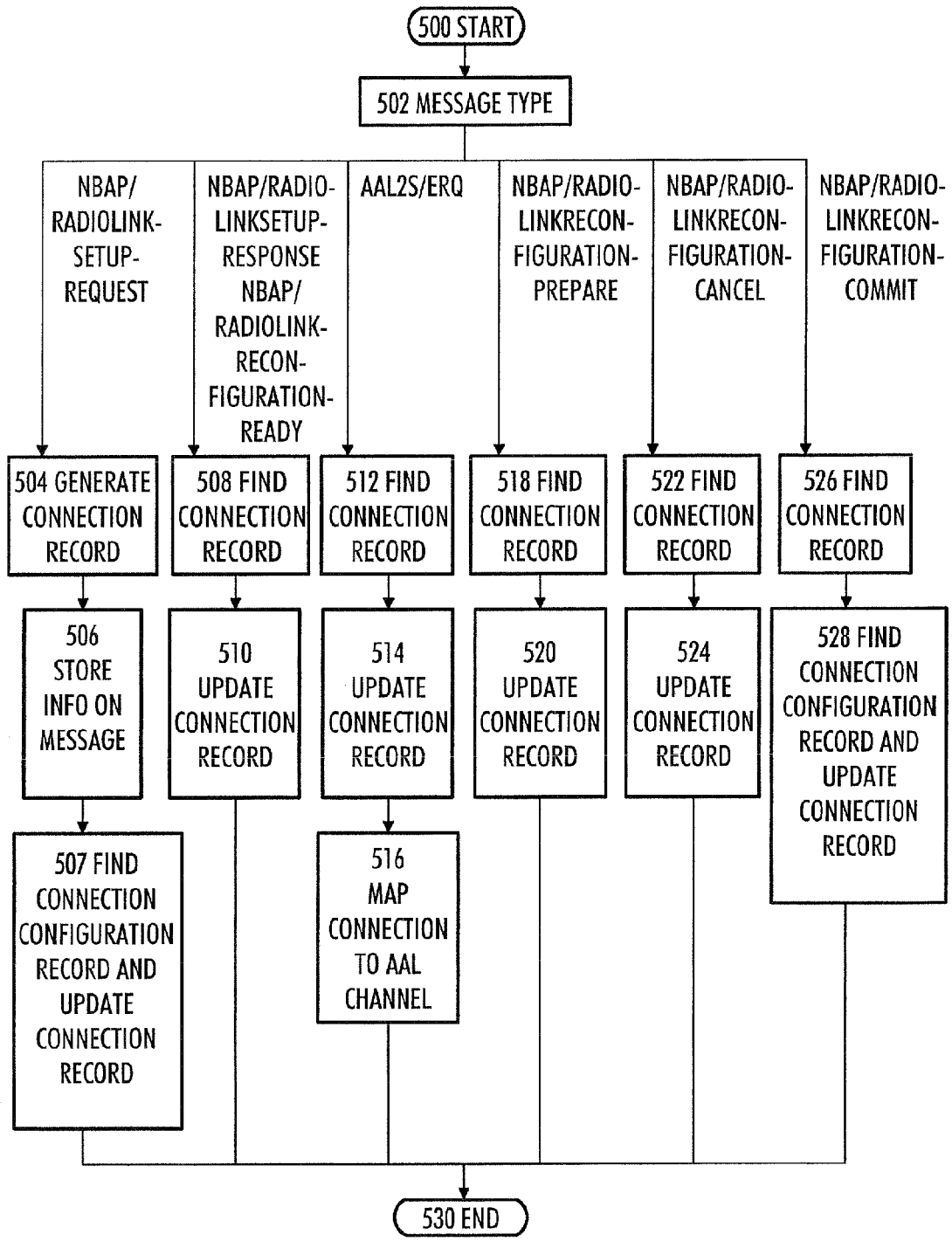
Figure 7:
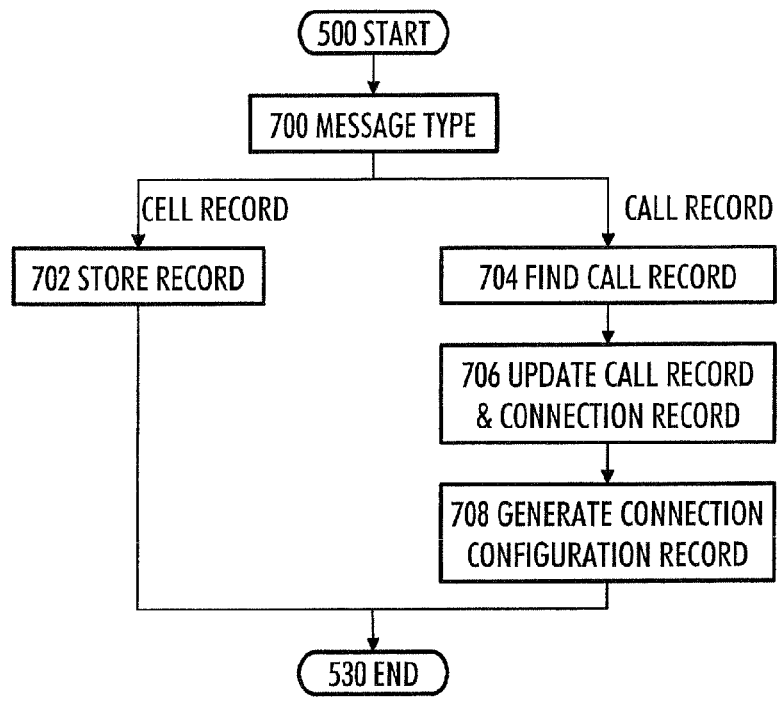

Next, referring to FIGS. 5, 6 and 7, message processing in an analyzer is illustrated. Monitoring handover in a 3G cellular network is used as an example. The method begins at 500 and ends at 530. At 502, the type of the captured message is found out.

If the message is an "NBAP/RadioLinkSetupRequest" message, a connection record 208 is created at 504, and at 506 the following information on the message contents is stored in the connection record 208:

CRNC communication context identifier identifying the connection with a controlling radio network controller;

transaction identifier identifying the message transaction between the base transceiver station and the radio network controller;

from the information element "UL DPCH Information", the scrambling code of the uplink used by the user equipment is stored;

from the information element "DCH Information", the DCH identifier is stored which identifies the traffic channel and transport formats indicating the transmission forms of the traffic channels of the connection (transmission block size, number of transmission blocks);

from the information element "RL information", the cell identifier identifying the cell in which the radio link is created and the radio link identifier identifying the radio link in the cell are stored;

507 comprises searching for a connection configuration record 212 whose sizes and numbers would match with the ones stored in the connection record 208, and if such a record is found, updating the information of the connection configuration record 212 in the connection record 208.

If the message is an "NBAP/RadioLinkSetupResponse" message, 508 comprises searching for a connection record 208 in which the CRNC communication context identifier and transaction identifier are the same as in the received message, and 510 comprises storing the following information of the message in the connection record 208:

base station communication context identifier identifying the connection at the base transceiver station;

from the information element "DCH information", a binding identifier identifying the user's data flow and a transport layer address which is the traffic channel's transmission address are stored for each traffic channel identified with a DCH identifier.

If the message is an "AAL2S/ERQ message, 512 comprises searching for a connection record 208, in which the transport layer address is the same as the NSEA (destination service NSAP endpoint address), and the binding identifier is the same as the SUGR (served user generated reference), the following information of the message being stored in the record 208 at 514:

channel identifier which is the channel (CID) of the AAL2 connection to be set up;

path identifier which identifies the VPI and VCI of the AAL2 connection to be set up together with NSEA.

516 comprises mapping the connection to the physical AAL2 channel on the basis of the channel identifier, path identifier and transport layer address of the connection record 208. In addition, 516 comprises configuring the decoding components on the basis of the connection record information.

If the message is an "NBAP/RadioLinkReconfiguration-Prepare" message, 518 comprises searching for the connection record 208 in which the base station communication context identifier is the same as in the received message, and 520 comprises adding modified information to the connection record as follows:

replacing the transaction identifier with the one in the message;

from the information element "UL DPCH Information", a new uplink scrambling code is added;

modified TFS is added to the traffic channel indicated by the DCH identifier of the information element "DCHs to modify";

from the information element "DCHs to add", the DCH identifiers and TFSs are stored.

If the message is an "NBAP/RadioLinkReconfiguration-Ready" message, 508 comprises searching for the connection record 208 in which the CRNC communication context identifier and the transaction identifier are the same as in the message, and 510 comprises storing the following information elements of the message in the connection record 208 found:

from the information element "DCH information", a binding identifier and a transport layer address are stored for each traffic channel identified with a DCH identifier.

If the message is an "NBAP/RadioLinkReconfiguration-Cancel" message, 522 comprises searching for the connection record 208 in which the CRNC communication context identifier and the transaction identifier are the same as in the message, and 524 comprises deleting the modified information from the connection record 208.

If the message is an "NBAP/RadioLinkReconfiguration-Commit" message, 526 comprises searching for a connection record 208 in which the CRNC communication context identifier and the transaction identifier are the same as in the message, and 528 comprises replacing the original information of the connection record 208 with the modified information. In addition, 528 comprises searching for the connection configuration record 212 in which the sizes and numbers of the transmission blocks would match with the ones stored in the connection record 208, and if such a record is found, the information of the connection configuration record 212 is updated in the connection record 208.

If the message is an "RRC/RrcConnectionSetup" message, a new call record is created at 206. 602 comprises searching for a connection record 208 in which the uplink scrambling code is the same as the scrambling code number in the information element of the message "Uplink DPCH info", and creating a link between the call record 206 and the connection record 208. 604 comprises storing the following information in the connection record 208 and call record 206 from the information element "Signaling RB information to setup" of the message:

RB identities identifying radio bearers;

uplink and downlink RLC modes indicating the RLC channel mode used by the radio bearer;

uplink and downlink transport channel identities indicating the transmission channel used on the uplink and downlink;

logical channel identities identifying the logical channel of the MAC layer.

In addition, the following information is stored in the connection record 208 from the information element "Downlink information per radio link list":

scrambling code which is the one used by the base transceiver station on the downlink.

Furthermore, the following information is stored in the call record 206 from the information element "UE Information Elements":

new C-RNTI, which is a cell-specific temporary identifier allocated for the user equipment;

new U-RNTI, which is a temporary identifier allocated for the user equipment;

initial UE identity, which is the user identifier.

Still further, the following information is stored in the connection record 208 and the call record 206 from the information element "Uplink DPCH info":

scrambling code number, which is the scrambling code used by the user equipment on the uplink.

608 comprises searching for the cell record 204 on the basis of the scrambling code of the record 208 and the cell identifier of the record 208. If no existing cell record 204 is found, a new cell record 204 is created. If it is created, the new cell record can be transmitted to other protocol analyzers at 610. 611 comprises creating from the connection record a new connection configuration record 212, in which the transport formats, logical channel identifiers, mapped radio bearers and RLC modes are stored. The structure of the connection configuration record is indicated in Table 6.

TABLE 6

Connection configuration record

| Information | Meaning |
|---|---|
| Transport formats | See Table 5. |
| Logical channel identifiers | See Table 3. |

TABLE 6-continued

Connection configuration record

| Information | Meaning |
| --- | --- |
| Mapped radio bearers | See Table 3. |
| RLC (Radio Link Control) modes | See Table 3. |

If the corresponding connection configuration record 212 has already been created, a new one is not created. Further, 606 comprises configuring the decoding components on the basis of the information of the connection record 208.

If the message is an "RRC/RadioBearerSetup" message, 612 comprises searching for the connection record 208 on the basis of the AAL2 channel used. At 614 the radio bearer identifiers, radio bearer mapping to the logical channels and RLC modes of the radio bearer are stored from the message in the connection record and the call record linked to it. At 616, the decoding components are configured according to the connection record 208. 617 comprises creating from the connection record a new connection configuration record 212, in which the transport formats, logical radio bearers, mapped radio bearers and RLC modes are stored. If a corresponding connection record is found, a new one is not created.

If the message is the "RRC/ActiveSetUpdate" message, 618 comprises searching for the connection record 208 on the basis of the AAL2 channel used. 620 comprises updating the primary scrambling codes added to and removed from the linked call record 206. 622 comprises finding out whether new connections have been added to the active set. If new connections have been added, the cell record is searched for on the basis of the primary scrambling code, and the call record is transmitted to the protocol analyzer analyzing the cell in question.

700 comprises finding out the type of the message received from the second protocol analyzer.

If the message is a cell record, 702 comprises adding a cell record to the cell record list.

If the message is a call record, 704 comprises comparing the contents of the call record with the monitored cell records 204, and if the channel information indicates that the connection record belongs to the cells to be monitored, searching for an unfinished call record on the basis of the uplink scrambling code of the received call record. 706 comprises updating in the unfinished call record the information on the received call record, updating in the connection record linked to the call record the information on the combined call record, and configuring the decoding components according to the connection record. At 708, a new connection configuration record 212 is created from the connection record, and transport formats, logical channel identifiers, mapped radio bearers and RLC modes are stored in this connection configuration record. If a corresponding connection record is found, a new one is not created.

Figure 15:
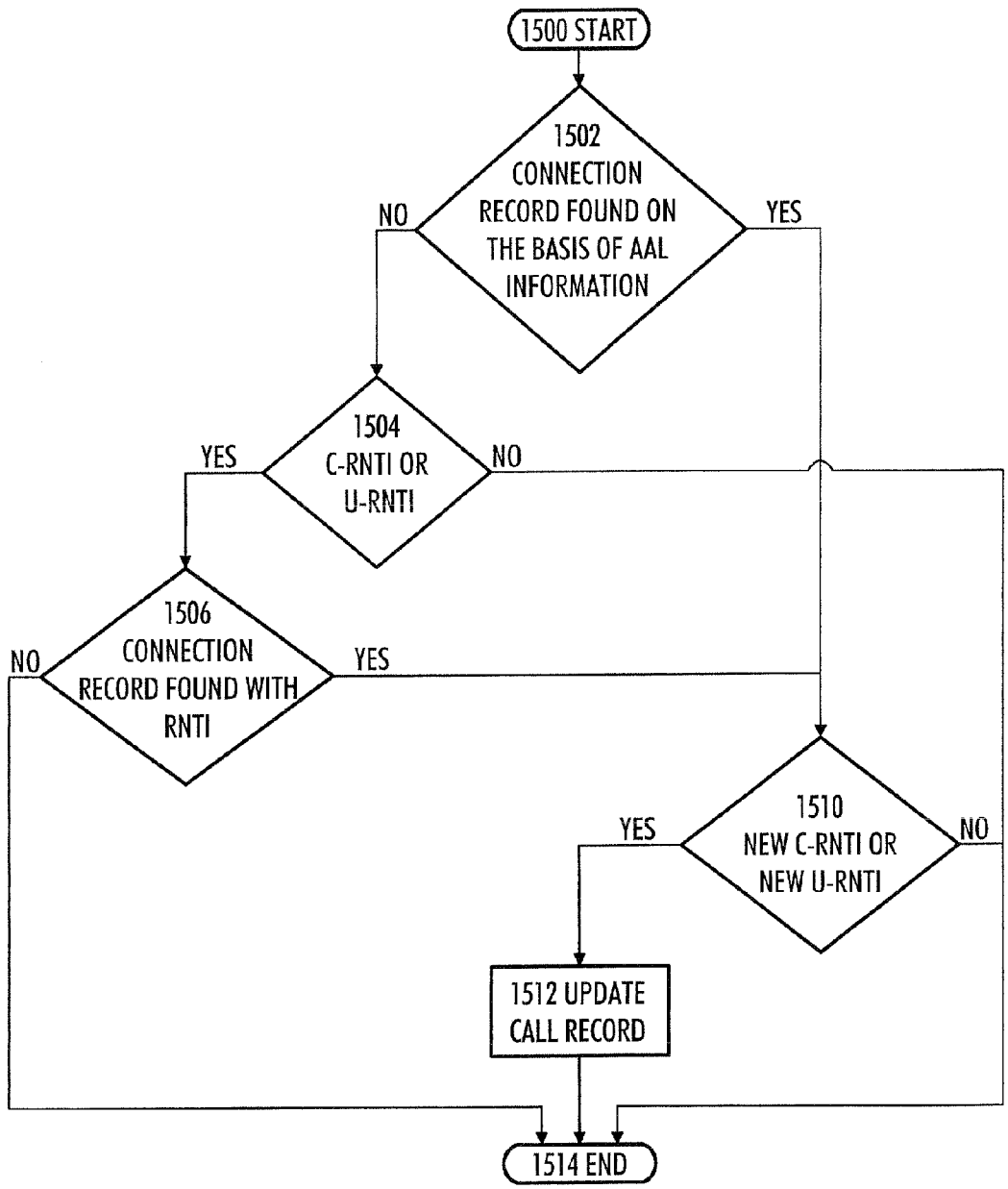
FIG. 15 illustrates finding connection information on the basis of an AAL2 connection, C-RNTI or U-RNTI.

The connection is identified, and the connection record 208 is found on dedicated channels on the basis of the AAL2 connection (VPI, VCI, CID and line identifier) and on common channels on the basis of C-RNTI or U-RNTI. FIG. 15 illustrates finding connection information on the basis of the AAL2 connection, C-RNTI or U-RNTI. The connection record 208 contains the identifiers of all AAL2 channels allocated for the user equipment, and a link to the call record 206, which contains the user equipment identifiers, such as C-RNTI and U-RNTI. The method begins at 1500. 1502 comprises searching for, among the records 208, the one that has the same AAL2 connection identifiers. If such a record is found, one moves on to 1510, otherwise to 1504. 1504 comprises finding out whether the captured message contains U-RNTI or C-RNTI in the MAC-layer header, or U-RNTI or C-RNTI in the RRC message; if it does, one moves on to 1506, otherwise to 1514. 1506 comprises searching for a call record in which RNTI is the same as the RNTI in the message. If such a record is found, one moves on to 1510, otherwise to 1514. 1510 comprises finding out whether the RRC message contains a "new U-RNTI" or a "new C-RNTI" information element; if it does, one moves on to 1512, otherwise to 1514. 1512 comprises updating the RNTI in the call record 206 according to the new RNTI. The method ends at 1514.

The subscriber identifier is stored in the call record 206 from an "RRC/RRCConnectionSetup" message. The identifier can be updated with an "MM/Location update accept" or an "MM/TMSI reallocation" message. In the updating, the updated value is stored. All subscriber identifiers of different types can be updated in the call record 206. The subscriber identifier is part of a call record, and by means of it the call tracing can continue through several analyzers.

If ciphering is used in the network to be monitored, the ciphering keys and counter values required by deciphering are collected to the call record. Implementing this involves monitoring the interface from which the ciphering keys to be used can be captured. When a 3G network is monitored, also the Iu-CS and Iu-PS interfaces are monitored, and the subscriber identifiers are captured in a connection-specific manner from GMM/MM messages containing them, and the ciphering keys are captured from RANAP messages, such as an "RANAP/SecurityModeCommand" message, the ciphering keys being added to the call record 206.

The ciphering keys can be captured in an assembly according to FIG. 1 in such a way that the first analyzer 112 is also arranged to monitor the Iu-CS and IuPS connections arriving to the RNC 110.

The initial value of the hyperframe numbers in the call record 206 can be captured from an "RRC/RrcConnectionSetupComplete" message.

The ciphering on the Iub interface can be deciphered with the Kasumi f8 algorithm by using the hyperframe number and ciphering key included in the call record; the other parameters (direction, sequence number) used in the deciphering are obtained from messages to be deciphered, and the radio bearer number can be searched for in the call record on the basis of the MAC channel number in the message to be deciphered. In the deciphering, the hyper frame number is increased at each CFN round.

Since the call may also begin on the second interface 116, the call record containing the ciphering keys is transmitted to the second analyzer 120 when the keys have been captured. The ciphering keys can also be captured with an analyzer that monitors only the interface containing the ciphering keys.

Figure 13:
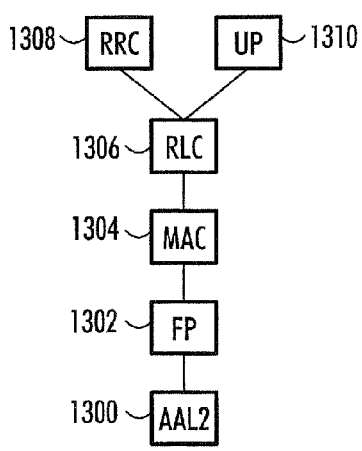
FIG. 13 illustrates an AAL2 protocol stack of the lub-interface.
Figure 14:
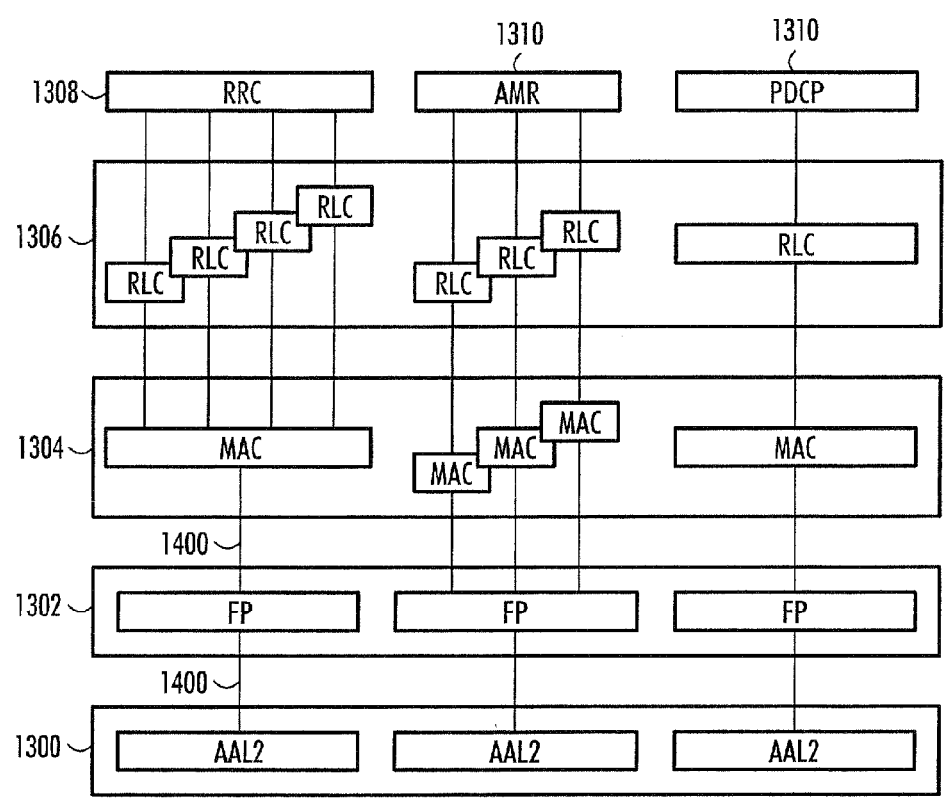
FIG. 14 illustrates typical dedicated connections used by a subscriber terminal, and protocol entities attending to them.

FIG. 13 shows a protocol stack used on AAL2 connections. The protocol stack is formed of an AAL layer 1300, an FP (Frame Protocol) layer 1302, an MAC (Medium Access Control) layer 1304, an RLC layer 1306 and an RRC layer 1308 or a user plane 1310. The user plane may be, for instance, data of a circuit-switched call or a packet-switched data connection. FIG. 14 illustrates typical connections in use during one call and protocol entities responsible for them. Typically, three AAL2 connections 1400 are set up for one call, i.e. one for the control plane, one for circuit-switched data and one for packet-switched data. The first connection involves transferring control-plane signaling, the second connection involves transferring circuit-switched data, here AMR (Adaptive Multi-Rate Speech Codec) speech, and the third connection involves transferring user-plane packet-switched data (PDCP=Packet Data Convergence Protocol). In order to enable the protocol monitoring, the analyzer must know the correct configuration for each protocol entity. The configuration of the protocol layers 1300 and 1302 are found out by monitoring the signaling of the NBAP and AAL2S protocols, which is performed each time a radio connection is opened. The protocol layers 1308, 1306 and 1304 are configured with RRC protocol signaling when connections are opened. To configure the protocol layers 1308, 1306 and 1304, a connection must be monitored beginning from the opening of the connections. In practice, monitoring from the beginning is not always possible. In such a case, the configuration can be performed by using configuration transferred from another analyzer, or automatic identification described in the following.

Figure 12:
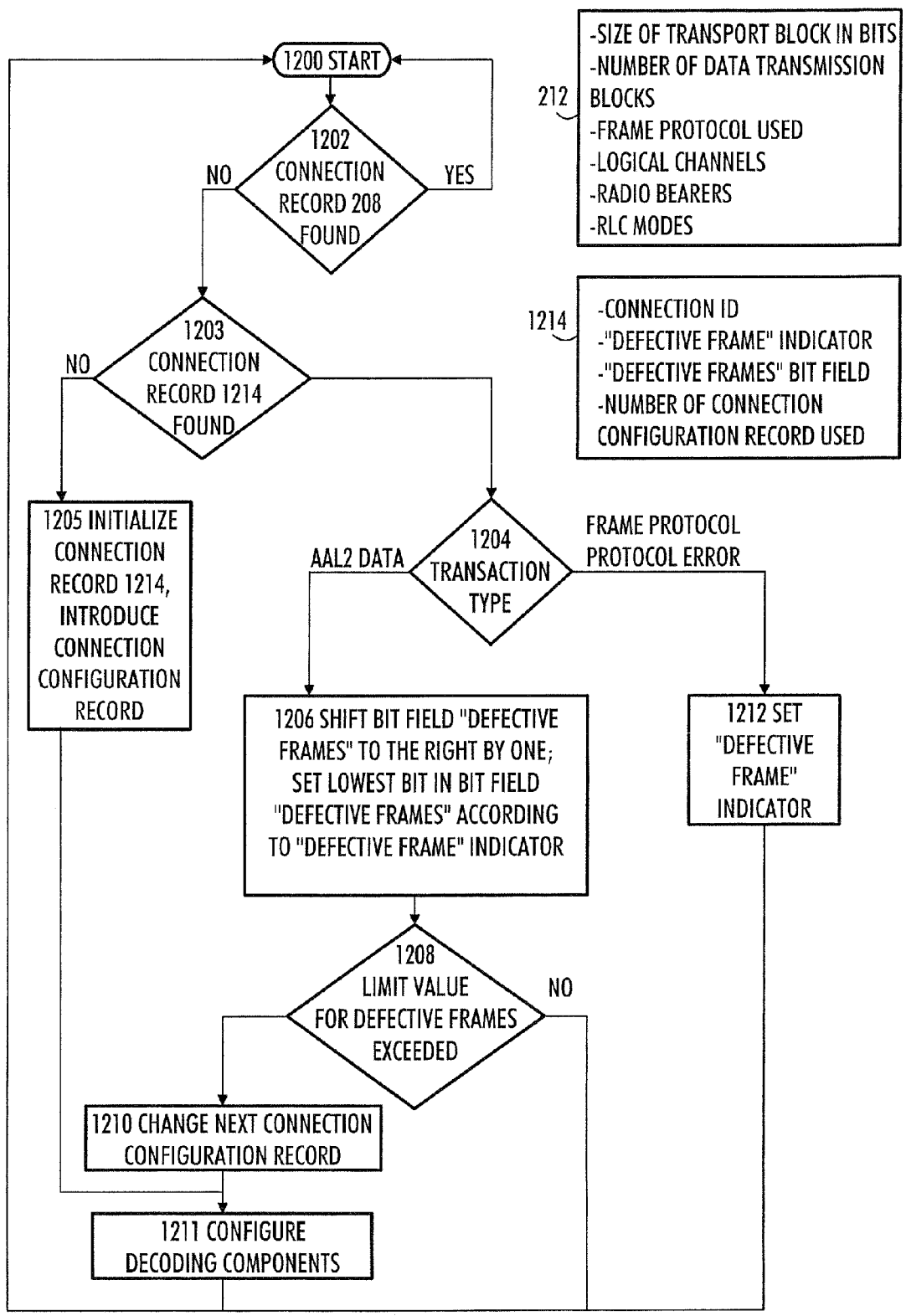
FIG. 12 illustrates automatic configuration of decoding components of an analyzer.

FIG. 12 illustrates the use of the connection configuration records 212 for automatic identification of protocol configuration. The method begins at 1200. 1202 comprises finding out whether the connection record 208 is found on the basis of the AAL2 channel. If it is found, the decoding components are configured according to the connection record 208, and one can return to 1200 to wait for the next message. If the connection record 208 is not found, one moves on to 1203. 1203 comprises finding out whether a connection record 1214 is found. If it is found, one moves on to 1204, otherwise to 1205. At 1205, the connection record 1214 is initialized and the first connection configuration record 212 is brought into use. At 1204, the type of the transaction is found out. If the transaction is an indication of a protocol error, one moves on to 1212. If the transaction is reception of an AAL2 frame, one moves on to 1206. At 1212, the connection record 1214 is searched for and a "defective frame indicator" is activated. 1206 comprises searching for the connection record 1214, shifting the "defective frame" bit field to the right by one, and setting the lowest bit of the bit field according to the "defective frame indicator". At 1208, it is found out in the bit field whether the number of defective frames exceeds a predetermined limit value. If the limit value is exceeded, one moves on to 1210; if the limit value is not exceeded, one returns to 1200. At 1210, the next connection configuration record is selected. At 1211, the decoding components are configured according to the connection configuration record selected. Finally, one returns to 1200 to wait for the next transaction. In order to avoid the need to search for the connection configuration over and over again, it is preferable to store the configurations in a file that can be loaded when the analyzer is started.

When the above-described automatic identification of protocol configuration is used in the analyzers, the configuration information of the protocols can be left out of the call record 206 to be transmitted to other analyzers, minimizing thus the communication because the analyzers are able to reliably find the protocol configuration themselves with the automatic identification.

Figure 11:
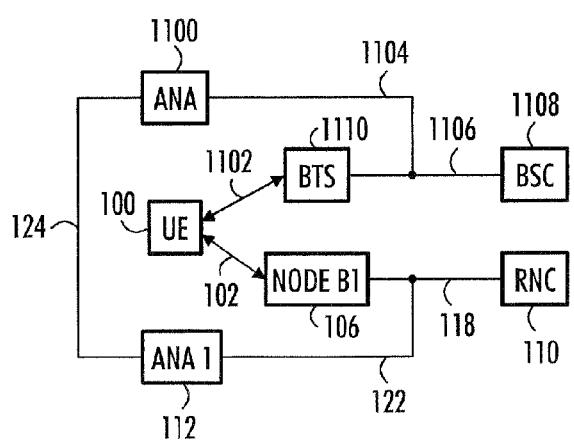
FIG. 11 illustrates monitoring of handover between a 2G and a 3G cellular radio network.

Next, handover from a 3G cellular radio network to a 2G cellular radio network is described according to FIG. 11. In the figure, the 2G cellular radio network is represented by a base transceiver station 1110 and a controlling base station controller 1108. An analyzer 1100 is coupled 1104 to monitor the 2G cellular radio network.

First, the analyzers 112 and 1100 collect channel information from the data transmission connections 118, 1106 and distribute the channel information to the other analyzers 112, 1100. The user equipment establishes the first radio connection 102 to the base transceiver station 106. The protocol analyzer 112 captures the configuration information of the connection from different messages, for example "NBAP radio link setup" message, "RRC connection setup" message and "ALCAP ERQ" message, from the Iub interface 118.

The radio network controller 110 transfers the user equipment 100 to the 2G network by transmitting to it a "HANDOVER FROM UTRAN COMMAND GSM" message that includes information on a radio link 1102 of a new cell. Having captured the message, the analyzer 112 transmits, via the local area network 124, the call record 206 to the analyzer 1100 monitoring the 2G cellular radio network. The connection-monitoring component 200 of the analyzer 1100 adds the information on the received call record to the existing call record and configures the decoding components of the protocols according to the combined call record. Correspondingly, all kinds of handovers can be monitored in 2G and 3G networks and between them.

Although the invention has been described above with reference to the example according to the attached drawings, it is obvious that the invention is not restricted to it but can be modified in a plurality of ways within the scope of the attached claims.

The invention claimed is:

1. A method for monitoring data transmission connections between a cellular radio network and a subscriber terminal with an analyzer, the method comprising:
   collecting connection information on a data transmission connection of the subscriber terminal to a cell;
   generating, on the basis of the connection information, connection configuration records that contain information on detected and predetermined data transmission configurations, the connection configuration records containing at least one of the following: transport formats, logical channel identifiers, mapped radio bearers and Radio Link Control (RLC) modes; and
   identifying a protocol configuration automatically by comparing the connection information with the connection configuration records on the basis of a predetermined logic.

2. A method according to claim 1, further comprising:
   generating, on the basis of the connection information, call records containing information required for monitoring a given data transmission connection and decoding messages;
   generating, on the basis of the connection information, connection records for monitoring a given type of data transmission method and decoding messages; and
   linking call records and connection records with each other.

3. A method according to claim 2, further comprising:
   processing in the call record at least one of the following as connection information: a Cell Radio Network Temporary Identifier (C-RNTI), a UTRAN Radio Network Temporary Identifier (U-RNTI), a state of the Radio Resource Control (RRC) connection, a subscriber terminal identifier, a subscriber identifier, an uplink scrambling code, an active set, a Radio Access Bearer (RAB), and a ciphering key.

4. A method according to claim 3, further comprising:
   processing in the call record, with regard to the RAB, at least one of the following: a layer type, logical channel identifiers, mapped radio bearers, Radio Link Control (RLC) modes, and hyperframe numbers.

5. A method according to claim 2, further comprising:
   processing in the call record at least one of the following as connection information: a Controlling Radio Network Controller (CRNC) communication context identifier, a base station communication context identifier, a transaction identifier, DCH channels, and radio links.

6. A method according to claim 5, further comprising:
processing in the connection record, with regard to the DCH channel, at least one of the following: a DCH identifier, an uplink scrambling code, transport formats, mapped radio bearers, logical channel identifiers, RLC modes, a binding identifier, a transport layer address, a path identifier, a channel identifier, a virtual route identifier, a channel identifier, and a line identifier.

7. A method according to claim 1, further comprising:
configuring decoding components according to a selected connection configuration record.

8. A method according to claim 1, further comprising:
storing the connection configuration records in a file.

9. A method according to claim 8, further comprising:
loading the connection configuration records from the file when the analyzer is started.

10. An analyzer for monitoring data transmission connections between a cellular radio network and a subscriber terminal, the analyzer comprising:
a monitoring unit configured to monitor a data transmission connection of the subscriber terminal to a cell; and
a processing unit configured to:
generate, on the basis of the connection information, connection configuration records that contain information on detected and predetermined data transmission configurations, the connection configuration records containing at least one of the following: transport formats, logical channel identifiers, mapped radio bearers, and Radio Link Control (RLC) modes; and
identify the protocol configuration automatically by comparing the connection information with the connection configuration records on the basis of a predetermined logic.

11. An analyzer according to claim 10, wherein the processing unit is further configured to:
generate, on the basis of the connection information, information required for monitoring a given data transmission connection and decoding messages;
generate, on the basis of the connection information, connection records containing information required for monitoring a given type of data transmission connection and for decoding messages; and
link call records and connection records with each other.

12. An analyzer according to claim 11, wherein the processing unit is further configured to process at least one of the following as connection information in the call record: a Cell Radio Network Temporary Identifier (C-RNTI), a UTRAN Radio Network Temporary Identifier (U-RNTI), a state of the Radio Resource Control (RRC) connection, a subscriber terminal identifier, a subscriber identifier, an uplink scrambling code, an active set, a Radio Access Bearer (RAB), and a ciphering key.

13. An analyzer according to claim 12, wherein the processing unit is further configured to process in the call record, with regard to the RAB, at least one of the following in the call record: a layer type, logical channel identifiers, mapped radio bearers, Radio Link Control (RLC) modes, and hyperframe numbers.

14. An analyzer according to claim 11, wherein the processing unit is further configured to process at least one of the following as connection information in the connection record: a Controlling Radio Network Controller (CRNC) communication context identifier, a base station communication context identifier, a transaction identifier, DCH channels, and radio links.

15. An analyzer according to claim 14, wherein the processing unit is further configured to process, with regard to the DCH channel, at least one of the following in the connection record: a DCH identifier, an uplink scrambling code, transport formats, mapped radio bearers, logical channel identifiers, RLC modes, a binding identifier, a transport layer address, a path identifier, a channel identifier, a virtual path identifier, a virtual channel identifier, a channel identifier, and a line identifier.

16. An analyzer according to claim 10, wherein the processing unit is further configured to configure decoding components according to a selected connection configuration record.

17. An analyzer according to claim 10, wherein the processing unit is further configured to store the connection configuration records in a file.

18. An analyzer according to claim 17, wherein the processing unit is further configured to load the connection configuration records from the file when the analyzer is started.

19. An analyzer for monitoring data transmission connections between a cellular radio network and a subscriber terminal, the analyzer comprising:
monitoring means for monitoring a data transmission connection of the subscriber terminal to a cell;
first processing means for generating, on the basis of the connection information, connection configuration records that contain information on detected and predetermined data transmission configurations, the connection configuration records containing at least one of the following: transport formats, logical channel identifiers, mapped radio bearers, and Radio Link Control (RLC) modes; and
second processing means for identifying the protocol configuration automatically by comparing the connection information with the connection configuration records on the basis of a predetermined logic.

20. An analyzer according to claim 19, wherein the first processing means configures decoding components according to a selected connection configuration record.

21. An analyzer according to claim 19, wherein the first processing means stores the connection configuration records in a file.

22. An analyzer according to claim 21, wherein the first processing means loads the connection configuration records from the file when the analyzer is started.

23. A non-transitory computer-readable recording medium having a computer program recorded thereon that causes a computer to monitor data transmission connections between a cellular radio network and a subscriber terminal, the program causing the computer to execute operations comprising:
collecting, by means of an analyzer, connection information on a data transmission connection of the subscriber terminal to a cell;
generating, on the basis of the connection information, connection configuration records that contain information on detected and predetermined data transmission configurations, the connection configuration records containing at least one of the following: transport formats, logical channel identifiers, mapped radio bearers, and Radio Link Control (RLC) modes; and
identifying a protocol configuration automatically by comparing the connection information with the connection configuration records on the basis of a predetermined logic.

24. A non-transitory computer-readable recording medium according to claim 23, wherein the program further causes the computer to execute an operation comprising:
    configuring decoding components according to a selected connection configuration record.

25. A non-transitory computer-readable recording medium according to claim 23, wherein the program further causes the computer to execute an operation comprising:
    storing the connection configuration records in a file.

26. A non-transitory computer-readable recording medium according to claim 25, wherein the program further causes the computer to execute an operation comprising:
    loading the connection configuration records from the file when the analyzer is started.

* * * * *